United States Patent [19]

Sponaes et al.

[11] 4,062,644
[45] Dec. 13, 1977

[54] TRANSFER INK AND METHOD OF USING SAME

[75] Inventors: John R. Sponaes, Metuchen; Wilhelm P. Kutsch, Colonia, both of N.J.

[73] Assignee: Graphic Magicians, Inc., New York, N.Y.

[21] Appl. No.: 672,025

[22] Filed: Mar. 30, 1976

[51] Int. Cl.² .................... F41H 1/02; F41H 1/04
[52] U.S. Cl. .................. 8/2.5 A; 106/22; 156/230; 101/470; 106/25; 106/26; 106/30; 106/32; 156/234; 156/236
[58] Field of Search .......... 106/311, 22, 25, 26, 106/30, 32; 156/234, 230, 236; 8/2.5 A; 427/147, 152, 148; 101/470

[56] References Cited

U.S. PATENT DOCUMENTS

| 2,375,230 | 5/1945 | Kline | 106/22 |
|---|---|---|---|
| 2,426,194 | 8/1947 | Fischback et al. | 106/22 |
| 3,632,291 | 1/1972 | Defago et al. | 101/470 |
| 3,653,903 | 4/1972 | Nihyakumen et al. | 96/49 |
| 3,672,842 | 6/1972 | Florin | 106/22 |

FOREIGN PATENT DOCUMENTS

| 7,200,251 | 6/1972 | Japan | 106/22 |
|---|---|---|---|
| 1,206,534 | 9/1970 | United Kingdom | 106/22 |

*Primary Examiner*—Joan E. Welcome
*Attorney, Agent, or Firm*—Charles E. Temko

[57] ABSTRACT

A transfer ink suitable for dispersion from a felt nib pen upon a paper substrate for subsequent transfer by heat to fabrics formed at least partially from synthetic fibers. The ink comprises of a sublimation dye, organic solvent or water, binders and an optional non-ionic surfactant. It is particularly adapted for household, as distinguished from commercial use.

2 Claims, No Drawings

TRANSFER INK AND METHOD OF USING SAME

BACKGROUND OF THE INVENTION

This invention relates generally to the field of heat transfer type dye compositions, and more particularly to an ink containing such dyes in the form an an ink applied to a transfer substrate for subsequent heat transfer by sublimation to the surface of an article, most commonly a garment made of textile materials. It is well known in the art to employ oil, gravure or flexo heat transfer inks for printing on a transfer substrate, using predetermined patterns, and then transfer that particular pattern to a garment. Such use is common by the garment makers.

It is also common to paint directly onto the garment by silk screen printing or other printing techniques common in the garment industry, which permit rapid replication of the same pattern at very low cost.

Such techniques do not lend themselves to using this medium for individual artistic expression, where the user desires a decorated garment which is unique, and which embodies the artistic efforts of the wearer. Felt nib pens are convenient tools for the preparation of custom substrates, but are not suitable for use with inks presently available in the art, which not only have a deleterious effect upon the felt nib pen but which are inherently messy, and not easily cleaned, particularly by young children. Further, the consistency of the ink is relatively heavy, and does not feed well by capillary action through the nib of the pen. Once the ink dries on the pen, it is practically impossible to dissolve it, and the pen, or at least the nib must be discarded.

SUMMARY OF THE INVENTION

Briefly stated, the invention contemplates the provision of a water based sublimation transfer ink, the consistency of which permits ready dispersal using a felt nib pen upon a paper or similar substrate for subsequent heat transfer, after the ink has dried, to a textile fabric formed at least partially of synthetic resinous fibers. The ink essentially comprises a sublimation dye in either crude or dispersed form, a primary solvent, preferably ethylene glycol monoethyl ether (or water depending upon what type of ink is to be employed), small amounts of a secondary solvent, preferably in the form of a high boiling point ketone or higher alcohol, a small amount of binder and an optional non-ionic surfactant. Because of the use of relatively low viscosity, slow drying solvents, the inks may be kept almost indefinitely in a tightly stoppered container, and conveniently loaded at periodic intervals into a felt nib pen, whereby the same may be manually dispersed upon the substrate to form any desired design. When spread in a thin coating, evaporation of the solvent takes place within a few seconds, so that upon completion of the design, the substrate is ready for immediate transfer using a conventional household iron. In the following examples, which are illustrative, proportions are by weight.

EXAMPLE 1

| | |
|---|---|
| Sublimation dye (Intratherm Red 314) Disperse Red 60 | 5% |
| Primary Solvent (Ethylene Glycol Monoethyl Ether) | 80% |
| Secondary Solvent (Cyclohexanone) | 10% |
| Binder (Alcohol Soluble Rosin) | 3% |
| Non-ionic surfactant | 2% |

The above formulation provides a rapid drying ink having a high degree of flowability.

EXAMPLE 2

| | |
|---|---|
| Sublimation dye (Dispersed Latyl Yellow 4RL) | 10% |
| Primary Solvent (Water) | 60% |
| Secondary Solvent (Ethylene Glycol Mono ethyl Ether) | 30% |

The above ink is somewhat slower drying than the ink of Example 1.

FURTHER EXAMPLES

Using Example 1 as a starting point, a secondary solvent may be substituted by ethyl alcohol. Methyl alcohol is, of course, toxic and therefore not desirable. The secondary solvent may also be substituted by higher alcohols, such as glycols, ketones or aromatic solvents, depending upon desired solubility and evaporation rate. As has been mentioned, solvent choice is of substantially importance because of the potential solubility of the ink container. Strong solvents will attack a nib pen barrel or a synthetic pen tip.

The binder may be substituted by various alcohol soluble rosins, esters, ethyl and nitrate celluloses, alcohol-soluble propionates and/or butyrates, natural gums and shellac, all of which can be employed to control viscosity, rub and offsetting qualities. The amount of surfactant, an optional ingredient, will depend upon the particular quality of paper employed as a substrate, and it serves its normal function to improve flow and wetting of the substrate surface.

Transfer to the textile surface is accomplished at a temperature of 385°–420° F., well within the capability of a conventional household iron. The transferred image will be lightfast and washfast depending upon the particular dye used and the fiber onto which the dye is transferred.

We wish it to be understood that we do not consider the invention limited to the precise details disclosed, for obvious modifications will occur to those skilled in the art to which the invention pertains.

We claim:

1. The method of forming an ink design on a textile surface comprising the steps of: providing a paper substrate; providing a transfer ink consisting essentially by weight of 5 to 10% of an organic dye selected from the group consisting of aniline and azo dye; 50 to 85% of a primary solvent selected from the group consisting of ethylene glycol monoethyl ether and alcohols; 5 to 34% of a secondary solvent having a boiling point substantially higher than that of said primary solvent selected from the group consisting of higher boiling point ketones, alcohols, glycols and aromatic solvents; 1 to 5% of a binder selected from the group consisting of alcohol soluble rosins, esters, ethyl cellulose, natural gums and shellac; using a felt nib dispenser, applying said ink to a surface of said substrate; allowing said ink to dry; placing said surface of said substrate in juxtaposition to said first mentioned textile surface, and applying heat to transfer at least a portion of said ink to said first mentioned surface.

2. The method of forming an ink design on a textile surface comprising the steps of: providing a paper substrate; providing a transfer ink consisting essentially by weight of approximately 10% of an organic crude or dispersed dye selected from the group consisting of aniline and azo dyes; approximately 60% of a primary solvent consisting of water; and approximately 30% of a secondary solvent selected from the group consisting of ethylene glycol monoethyl ether and ethyl alcohol; using a felt nib dispenser, applying said ink to a surface of said substrate; allowing said ink to dry; placing said surface of said substrate in juxtaposition to said first mentioned surface; and using heat to transfer at least a portion of said ink to said first mentioned textile surface.

* * * * *